Figure 1:
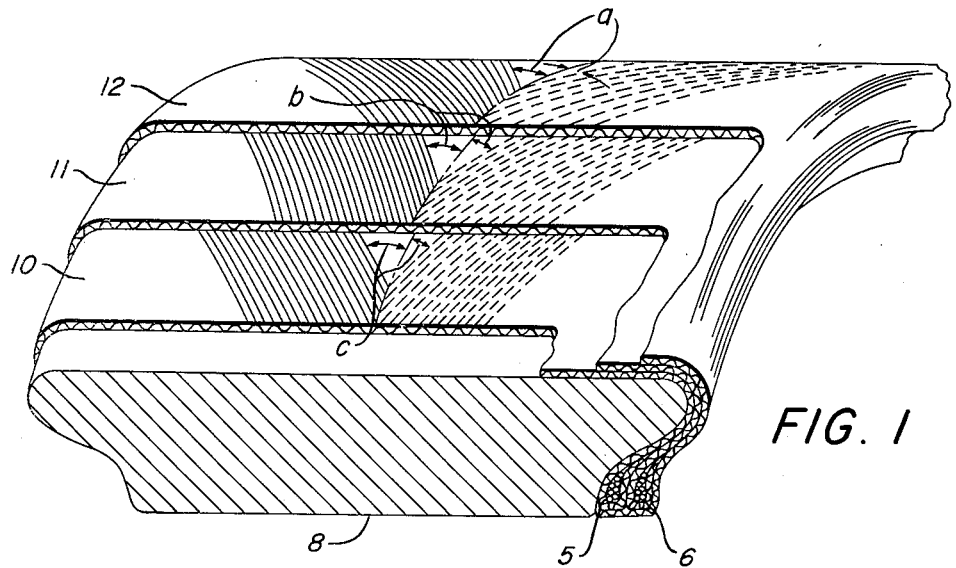

INVENTOR.
THOMAS R. WILLIAMS
BY
ATTORNEY

U̲n̲i̲t̲e̲d̲ S̲t̲a̲t̲e̲s̲ P̲a̲t̲e̲n̲t̲ O̲f̲f̲i̲c̲e̲

3,057,391
Patented Oct. 9, 1962

3,057,391
MULTIPLE-BEAD TIRE
Thomas R. Williams, 2415 Brice Ave., Akron, Ohio
Filed Apr. 30, 1959, Ser. No. 810,149
1 Claim. (Cl. 152—356)

This invention relates to an improved multiple-bead tire and the method of making it.

Multiple-bead tires are used on trucks, busses and off-the-road vehicles. They are designed to carry heavier loads than single-bead tires. It is therefore important that the load be distributed as evenly as possible among the many cords in the various plies of the carcass.

The carcass of a tire is now generally made on what is known as a flat-band drum. The drum has a substantially flat cylindrical surface which is wide enough to support more than one half of the bead-to-bead width of the tire. The plies of fabric constituting the carcass are bias-cut and are built up on this flat-band drum. The cords in the fabric are placed at an angle to the center line of the tire. Half of the plies angle in one direction from the center line and the other half angle in the opposite direction. The ends of the plies are locked around the one or more bead cores on each side of the drum, and generally, although not necessarily, the ends of the drum are undercut so that the ends of the plies extend radially and toward one another a substantial distance from the cylindrical surface of the drum before being locked around the bead cores. The plies are covered with tread and side-wall stock to complete the green tire. Breaker strips, chafer strips, etc. may be incorporated in the tire, as desired.

After the green tire has been built up in this manner it is expanded to shape and then placed in a mold and cured.

When the tire is expanded from the green shape in which it is built on the drum to its final cured shape, the various plies necessarily shift with respect to one another, so that the cord angles in the finished tire are much smaller than in the green tire. The cord length required with the cords at any specified angle in the finished tire is a matter of calculation known in the art.

What is most important, the shifting of the cord angles changes the required cord lengths in the various plies because the outer plies are longer than the inner plies. If all of the plies in a tire were of the same length they would be under equal strain after being shifted through the same angle. But the plies are not of the same length. The outer plies are necessarily longer than the plies under them, and after shifting, the longer outer plies are under lesser tension than the shorter inner plies if they are all shifted the same number of degrees.

According to this invention, the tension on the shifted cords is equalized by using inner plies with a larger cord angle and outer plies with a smaller cord angle.

In the manufacture of passenger tires which require only a relatively small number of plies, usually not more than four, the angle the cords make with the center line of the tread may be the same in all of the plies and when the tire is expanded and then cured the cords will all be under substantially the same stress because there is no great difference in length between the cords of the inner plies and the cords of the outer plies. However, in multiple-bead tires a relatively large number of plies is required, e.g. eight plies up to twenty or more. Therefore, the cords in the outer plies are substantially longer than the cords in the inner plies, and to compensate for this difference in length the angles through which the cords shift must be different, or the cords in the outer plies will be under less stress or tension than the cords in the inner plies. The tauter cords carry the load, and the loose cords contribute nothing to the load strength of the tire.

According to this invention, the cords in the plies of a multiple-bead tire are arranged at different angles to the center line of the tire. The cords of the inner plies make a larger angle with the center line of the tire than the cords of the outer plies. The difference in the angles may progress in small increments from the innermost ply to the outermost ply, but generally the angle of the cords in several adjacent plies will be the same. For instance, in a twin-bead tire, the cords in all of the plies which are locked to the inner bead cores may make a somewhat larger angle to the center line of the tread than the cords of all of the central plies which are locked to the outer bead cores, and these in turn may make a somewhat larger angle with the center line than the cords of all of the outer plies which are locked around both bead cores on each side of the tire.

The invention is applicable to tires regardless of the composition of the plies. Thus, the carcass may be of cotton, rayon, nylon, wire, etc.

The new tires in which the load is carried to a substantially equal extent by all of the cords gives greater strength and is therefore more safe. It is more stable and rigid so that it corners better; and it gives longer tread wear.

The invention will be further described in connection with the accompanying drawings which illustrate a preferred tire constructed according to the invention in which the cord angles of all the inner plies are the same, those of all the central plies are the same and less than those of the inner plies, and those of all of the outer plies are the same and less than those of the central plies.

Figure 2:
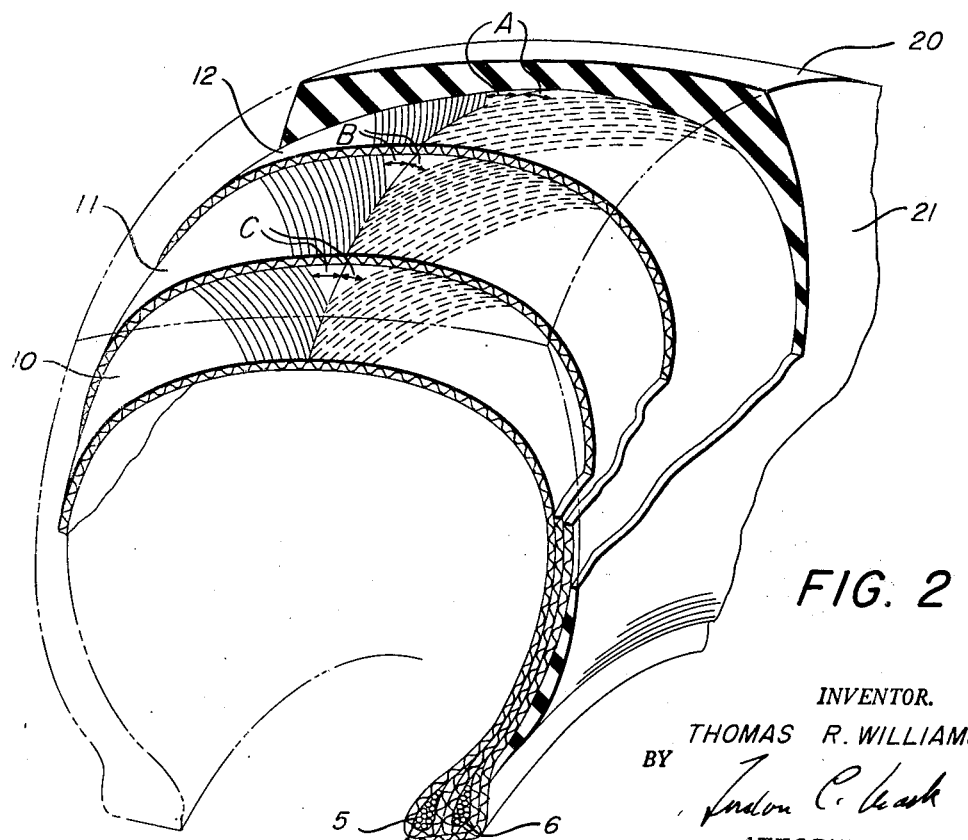

In the drawings:

FIGURE 1 is a section through a flat-band drum with the several plies shown schematically upon it without the tread rubber, with the groups of plies broken away in such a manner as to show their interrelation and readily compare the cord angles in the different plies; and FIGURE 2 is a section through the finished tire with the tread and side walls cut away and the group units of plies shown schematically and partly broken away for ready comparison.

It would complicate the drawings to show each individual ply. To simplify the illustration and the understanding of the invention the groups of plies are illustrated as a group unit, and the cords of the plies in each group make the cord angle with the center line in one direction (shown in full lines) and some in the reverse direction (indicated in dotted lines), as is customary in the art. The alternate plies may be reversed or adjacent plies may have parallel cords with the next adjacent plies reversed, etc. for any combination of ply-angle reversals as is known in the art.

The drawings illustrate a truck or bus tire having twin beads at 5 and 6 on each side of the tire. The green tire is built on the flat-band drum 8 as shown in FIG. 1 and then this green tire is expanded in the manner well known in the art to the shape illustrated in FIG. 2 in which shape the tire is cured in a mold.

Although as explained, the drawing indicates three group units of fabric, actually there may be eight or twelve plies or any usual number. The inner plies illustrated at 10 are locked to the inner bead cores 5; central plies 11 are locked to the outer bead cores 6; and outer plies 12 are locked around both bead cores—all as customary in the art. These plies may be of cotton, rayon, nylon, wire or any type of cord structure.

To illustrate, the tire may be a so-called 10.00—20, meaning that the opening at the center of the tire is 20 inches in diameter, and the tire measures approximately 10 inches in cross section. The cords of the outer plies 12 which make an angle *a* with the center line of the tread may all lie at an angle of 56° to the center line. The angle *b* of the cords of the central plies may then be 56½° and the angle *c* of the cords of the inner plies may be 58°. These are the angles of the various plies in the green tire on the drum. In the expanded tire illustrated in FIG. 2 the angles have shifted so that the angle A of the outer plies 12 is 33½°. The angle B of the cords in the center plies is 36°, and the angle C of the inner plies is 36½°.

The fact that this tire is a balanced tire in which the cords are all carrying substantially the same load is evidenced by the fact that if the drum set requirements are calculated for plies with cords at these angles for a tire of this size built on said drum, the results are 23.90 inches for the outer plies, 23.94 inches for the central plies and 23.85 inches for the inner plies. The fact that these measurements are substantially the same is evidence of properly balanced tire construction.

Similarly calculating the drum set requirements for a tire of the same size and same number of plies in which all of the cord angles in the green tire are 58°, the calculated drum set requirements are 22.80 inches for the outer plies, 23.67 inches for the central plies, and 23.85 inches for the inner plies. This shows that the cords in the inner plies will carry more of the load than the cords of the central and outer plies. The cord angles after expansion would be about 38° in the outer plies, about 36½° in the inner plies, with the angle of the center plies being about 37°.

The tread rubber 20 and side-wall rubber 21 are applied to the green tire in the usual manner. The tire may have a liner such as is common in tubeless tires, and this liner may be puncture proof. Many of the modifications in tire construction known in the art may be utilized in the tire of this invention. The tire may be made on any type of flat-band equipment provided the flat surface of the drum supports at least about one half of the bead-to-bead width of the tire. The plies may be applied to the drum separately or several plies may be first banded together and then applied to the drum.

The invention is covered in the claim which follows.

I claim:

A twin-bead cured tire constructed of a plurality of cord plies in inner, intermediate and outer groups in each of which groups the cords are continuous from a bead on one side of the tire to a bead on the other side of the tire and all cords in each group make the same angle with the centerline of the tire, the ends of the plies of the inner group being locked to the inner bead cores, the ends of the plies of the intermediate group being locked to the outer bead cores, and the ends of the plies of the outer group being locked around both bead cores, all of the cords in each of said respective three groups of plies being parallel to one another, the angle the cords in the outer group of plies make with the centerline of the tire tread being smaller than the angle the cords in the plies of the inner group make with the centerline of the tire tread, and the angle the cords of plies of the intermediate group make with the centerline of the tire tread being intermediate between the aforesaid angles but much nearer the angle of the cords of the plies of the inner group than the angle of the cords of the plies of the outer group, so that the tension of the cords of all of the groups is substantially equal.

References Cited in the file of this patent

UNITED STATES PATENTS

| | | |
|---|---|---|
| 1,493,674 | Hopkinson | May 13, 1924 |
| 1,989,956 | Ulrich | Feb. 5, 1935 |
| 2,225,042 | Elliott | Dec. 17, 1940 |
| 2,432,630 | Purdy | Dec. 16, 1947 |
| 2,703,128 | Darrow | Mar. 1, 1955 |
| 2,703,132 | Darrow | Mar. 1, 1955 |
| 2,752,980 | Riggs | July 3, 1956 |